United States Patent
Rantanen

[11] Patent Number: 6,046,458
[45] Date of Patent: Apr. 4, 2000

[54] PROTECTIVE SHEATH FOR AN IMAGE PLATE

[75] Inventor: Matti Rantanen, Kirkkonummi, Finland

[73] Assignee: Orion-Yhtyma OY, Finland

[21] Appl. No.: 08/966,454

[22] Filed: Nov. 7, 1997

[30] Foreign Application Priority Data

Nov. 11, 1996 [FI] Finland ................................ 964516

[51] Int. Cl.$^7$ ................................................. G03B 42/04
[52] U.S. Cl. ........................................ 250/485.1; 378/167
[58] Field of Search ................................ 250/485.1, 589, 250/590; 378/167, 177, 178, 179, 204, 180, 182, 184; 430/966, 967; 206/455

[56] References Cited

U.S. PATENT DOCUMENTS

| | | |
|---|---|---|
| 4,827,136 | 5/1989 | Bishop, Jr. et al. . |
| 5,185,776 | 2/1993 | Townsend ................................ 378/167 |
| 5,466,561 | 11/1995 | Rantanen . |

FOREIGN PATENT DOCUMENTS

| | | |
|---|---|---|
| 0 108 982 | 5/1984 | European Pat. Off. . |
| 0 394 564 | 10/1990 | European Pat. Off. . |
| WO 94/10605 | 5/1994 | WIPO . |

OTHER PUBLICATIONS

Abstracts of Japanese 1–082031, Mar. 28, 1989.
Abstracts of Japanese 4–319940, Nov. 10, 1992.

*Primary Examiner*—Edward P. Westin
*Assistant Examiner*—Richard Hanig
*Attorney, Agent, or Firm*—Banner & Witcoff, Ltd.

[57] ABSTRACT

A protective sheath (10) for an image plate, which covers a radiation- and light-sensitive surface (9) on an image plate (6) and which generally comprises a continuous first, reasonably rigid sheet section (1), having a size equal to that of the image plate, as well as a second reasonably rigid sheet section parallel to the first sheet section or two parallel second, reasonably rigid sheet sections (2a, 2b), which is/are at edges (15a, 15b) thereof attached (8) to two opposite outer edges (5a, 5b) of the first sheet section. A first (3) and a second surface (4), facing each other and included in the first sheet section and in the second sheet sections, respectively, have therebetween a distance (H1) which is substantially equal to a thickness (D1) of the image plate and the first surface (3) is provided with a coating (7) protecting the radiation- and light-sensitive image plate surface from damage. The protective sheath consists of materials transmissive to radiation used in imaging, but substantially non-transmissive to light. The image plate is transferred into a gap between the first and second surface of the protective sheath inwards (P1) and out of the gap therebetween outwards (P2) in the direction of these surfaces.

47 Claims, 4 Drawing Sheets

PROTECTIVE SHEATH FOR AN IMAGE PLATE

The present invention relates to a protective sheath for an image plate, which covers at least the radiation- and light-sensitive surface of an image plate and which consists of a material transmissive to radiation used in imaging but substantially non-transmissive to light. The invention relates also to a method for manufacturing such a protective sheath as well as to the use of such a protective sheath.

Image plates have become increasingly popular over the past years, replacing more and more e.g. films based on silver salts, for recording an image produced by exposure to radiation, such as X-radiation, and for bringing the same to a readable form. After all, such films are disposable items and require wet development for bringing a latent image produced thereon during exposure to a visible form or generally to a silver image. As a result of exposure to radiation, such as X-radiation, the image plate also develops a latent picture, which can be read by scanning and brought to electrical form and recorded e.g. in the memory of a computer. After reading it, the image can be developed from its electrical form to be visible on a display screen and/or printed out on paper or some other desired material. In order to read it, the image plate is exposed point by point to radiation of a suitable wavelength, which is generally within the range of visible light, these parts of the image plate activating and emitting, generally on another wavelength, radiation which is collected and received and converted to electrical form by means of a photosensitive element, such as a photosensitive semi-conductor or a photomultiplier tube or some other equivalent component. The image plate is reusable after erasing it clean of the traces of a preceding picture by means of a uniform and sufficiently powerful light, having a wavelength which is generally within or close to the range of visible light. The wavelength used for reading an image plate, the wavelength of radiation emitted by such an activated image plate containing a latent picture, as well as the wavelength range adaptable to erasing an image plate clean for the reuse thereof may vary depending on the type and design of an image plate. In any case, these above-mentioned wavelengths differ substantially from that of the radiation used for producing a latent picture on the image plate. Thus, the handling of an image plate prior to the exposure imaging thereof presents no problem, since the image plate can be handled in normal indoor lighting unlike e.g. a photographic plate based on silver salts. However, the image plate must be well protected from all relevant activating and scanning radiation, such as light, between the exposure imaging and the reading of image information included in a latent picture, in order not to lose the information contained in the image plate.

Publication U.S. Pat. No. 5,466,561 discloses this type of protective sheath for an image plate. The protective sheath described in the cited publication comprises an image-plate enclosing soft bag which consists of a plastic film and inside which the image plate is inserted prior to imaging. This plastic film is transmissive to X-radiation used in imaging, but not to visible light. After pushing the image plate prior to imaging into the plastic bag, the latter will be sealed, which is understandable since the intraoral imaging discussed in the publication requires that the image plate be placed in the mouth of a patient. After the exposure imaging, the protective bag is cut open in the dark, the image plate is extracted from the bag and read by means of a reader. The image-plate protecting bag described in the cited publication is excellent whenever dealing with a small-size image plate, whereby the image plate can be readily inserted in and extracted from the bag. After all, the side of such a small-size intraoral image plate only has a length of a few centimetres and, thus, the procedure is understandably simple. Moreover, the protective bag set forth in the cited publication is also disposable, as it is sealed and must be cut open for bringing the image plate out for reading. This results in a waste of material, which is not substantial, however, when dealing with a small-size image plate. Nevertheless, there are plenty of applications in which the use of a large-size image plate is desirable, the size of an image plate possibly ranging from the size of a panoramic X-ray image plate. which may be about 4×12 cm at its smallest, up to the size used for imaging major portions of the body, which may be up to about 40×50 cm, the protective bag set forth in the cited publication is no longer practical. First of all, the insertion of a large-size image plate into a protective bag is difficult, and sometimes cannot be managed at all, which already at this point causes both the operating personnel a considerable waste of time due to repeated efforts and a waste of material since the protective bag may damage as a result of insertion attempts and it will be necessary to pick up another protective bag for another attempt. The extraction of an image plate from a protective bag is likewise inconvenient. These problems are at least partly due to the fact that the thin and flexible material of a plastic bag has a tendency of adhering to the image plate. In addition, being disposable, the large-size protective bags result in unnecessary waste of material. Hence, the method described in the cited publication for extracting the image plate from a plastic bag by means of magnets is not possible. On the other hand, in terms of a plastic bag, the only possible extraction means that can be used are those grabbing the very end of an image plate, which also limits the handling possibilities of an image plate.

Whenever it is desirable to use an image plate in conjunction with already existing X-ray equipment or the like exposure imaging equipment, previously operated with a conventional film, it is of course possible to deal with the image plate exactly the same way as with the film. Thus, the image plate can be placed in a light-tight cassette in an illuminated space, but after the imaging, the cassette must be opened in the dark and the image plate must be transferred also in the dark from the cassette to an image-plate reader. This is a highly inconvenient procedure to carry out in the dark, since a normal photographic cassette cannot be provided with any mechanical extractor but the job must be handled manually and precise positioning of the image plate in a reader is difficult as it is necessary to find a correct spot in an exactly correct position in the dark. On the other hand, if the previously used film cassettes are replaced by designing and manufacturing image plate cassettes enabling the automatic extraction of an image plate, such cassettes will be quite expensive and, since the user is forced to rebuild his or her entire stock of cassettes, it will be a major investment for the user and this alone may prohibit the switching from the use of a film to the use of an image plate.

An object of the invention is to provide a protective sheath for an image plate, which is adaptable for the protection of large-size image plates and within which an image plate is readily insertable and from within which an image plate is extractable without problems. A second object of the invention is a protective sheath of this type, which enables the use of an image plate in a user's old film-operated imaging cassettes and at the same time enables the implementation of an image-plate handling sequence as thoroughly as possible in lighting conditions which provide visibility for the user. A particular meaning of this is that the protective sheath must be able to facilitate the removal or extraction of an image plate from an imaging cassette and its transfer to and placement in an image-plate reader in room lighting. A third object of the invention is a protective sheath of this type, which enables the mechanical removal of an image plate from the protective sheath in an image-plate reader. A fourth object of the invention is a protective sheath of this type, which enables the use of various mechanisms for withdrawing an image plate from the protective sheath. A fifth object of the invention is a protective sheath of this type, which would have an attractive price and would not be a disposable item. Thus, the purpose is to enable the use of an image plate in conventional or a user's old film cassettes in such a way that these film cassettes would be subjected either to no modifications at all or the modifications would be as minor as possible. Thus, the image plates could be used in existing imaging equipment, such as X-ray equipment, without any modifications either and by using the imaging cassettes originally intended therefor.

The above drawbacks can be eliminated and the above objects are achieved by means of a protective sheath of the invention, which is characterized by what is set forth in the characterizing clause of claim 1, by means of a method of the invention for manufacturing such a protective sheath, which is characterized by what is set forth in the characterizing clause of claim 14, and by means of a novel use of the protective sheath, which is characterized by what is set forth in the characterizing clauses of claims 17 and 19.

The most important advantage of the invention is that, when using a novel protective sheath, the image plate can be placed in a cassette previously used in a desired exposure imaging apparatus, such as an X-ray apparatus and that the irradiated image plate plate can be removed from the cassette in lighting conditions which provide visibility for the operator, optimally in normal indoor lighting. The image plate is also transferable in such lighting to a reader, whereby any automatic image-plate transfer technique can be applied to move the image plate from the protective sheath to a reader. If the reader is light-tightly sealed, its operator can be in normal indoor lighting during this removal procedure or, if the image-plate reader is not light-tightly sealed, the operator must only stay in a darkened room for the duration of an image plate transfer to the reader since, during the course of reading, the image plate is in any case normally protected from harmful ambient light inside the reader. Even in this case, it is possible to use any suitable transfer means for taking the image plate to the reader, or the operator can perform this manually in an extremely simple manner, as it has been possible to effect the alignment of an image plate in the light. Thus, the manual operation even in the dark does not cause any problems. Other advantages of the invention include the fact that the protective sheath is attractive in terms of costs and it is reusable for a number of times and functional in connection with an image plate of any size, e.g. with a particularly large image plate. A protective sheath of the invention for an image plate is of course usable and preferable also when using it for imaging in techniques other than in a traditional imaging cassette. The image plate can be inserted e.g. in an X-ray apparatus in only its protective sheath of the invention provided that the apparatus is fitted with proper holders and transferred in this condition directly to an image-plate reader.

The invention will now be described in detail with reference made to the accompanying drawings.

The general features for a protective sheath or envelope 10 of the invention are visible in FIGS. 1A–3B. Thus, the protective sheath envelope 10 includes a continuous first sheet section 1, a material property thereof ranging from rigid to elastically flexible and being of a size at least equal to a radiation- and light-sensitive coating or surface 9 of an image plate 6, said surface having a length designated with reference L1 and a width with reference W6, and against which an outer image-plate face 29 pointing towards the radiation- and light-sensitive surface 9 travels when pushing or pulling the image plate 6 into the protective sheath 10 inwards P2 and when pulling or pushing the image plate outwards P1 from the protective sheath 10. Thus, the image plate 6 progresses into the protective sheath in such a way that the outer face 29 constituted by the light-sensitive image plate surface 9 and possible image-plate edges 19 travels along a first surface 3 constituted by the first sheet section 1 of the protective sheath and typically in contact with this first surface. In addition to the above, the protective sheath includes either a single second sheet section 2c, substantially parallel to this above-mentioned first sheet section 1 and a material property ranging from rigid to elastically flexible, as shown in FIGS. 2A–2C, or preferably two parallel second sheet sections 2a, 2b, with material properties ranging from rigid to elastically flexible, as hown in FIGS. 1A–1B and 3A–3B. These second sheet sections 2a, 2b or the second sheet section 2c are/is by the oppositely facing edges thereof or by two opposite extreme edges 15a and 15b thereof attached 8 to two opposite outer edges 5a, 5b of the first sheet section. These oppositely facing extreme edges 15a, 15b of the second sheet sections and the opposite outer edges 5a, 5b of the first sheet section are typically parallel to each other and the distance therebetween is equivalent to some planar stretch of the image plate, in this case a total width W3 for the image plate. The image plate 6 is normally of a rectangular format and, hence, it is appropriate that the protective sheath be of the same size and format. So the sections form a kind of an envelope with permanently open ends 14a, 14b for guiding the image plate 6 inwards P2 and outwards P1.

According to the invention, the facing inner surfaces of the first sheet section 1 and the second sheet section 2c or, respectively, the second sheet sections 2a–b, i.e. the first surface 3 and, respectively, a second surface 4 have therebetween a distance H1 which is substantially equal to an image plate thickness D1. Furthermore, according to the invention, at least the first surface 3 of the first sheet section, which, as described above, lies at least and explicitly against the outer face 29 of the radiation-and light-sensitive surface 9 of the image plate 6, is provided with a coating 7 for protecting the radiation- and light-sensitive image plate surface 9 from damage. Since the first sheet section 1 as well as the second sheet sections 2a–b, 2c are made of a relatively rigid or stiff material and at least the first surface 3 of the first sheet section has, by virtue of the coating 7, protecting damage-preventing, such as scratch-preventing properties relative to the image plate 6 and preferably also a relatively low friction with respect to the image plate, the image plate is readily pushable in the direction of the attachment 8 between the edges 5a, 5b and 15a, 15b into a space 20 between the first sheet section and the second sheet sections.

Figure 1A:
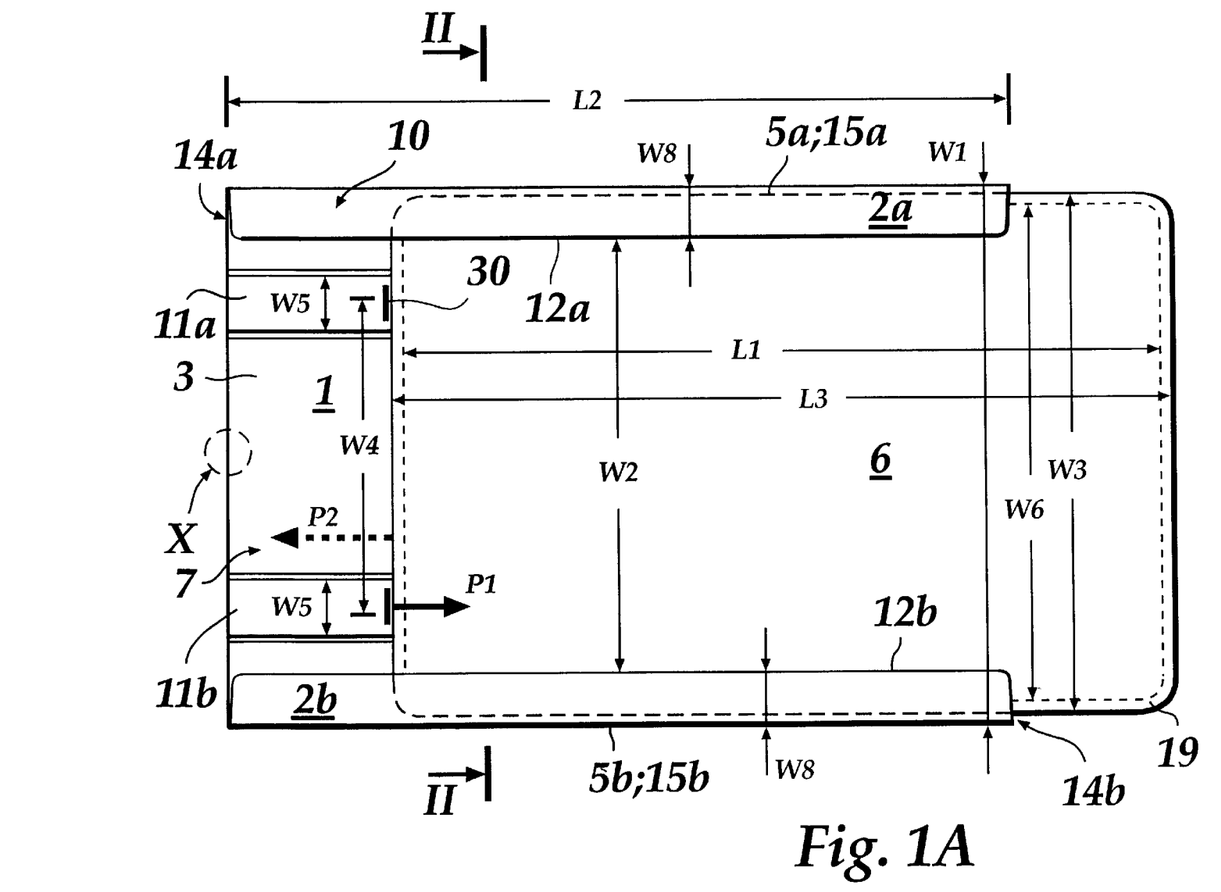
FIG. 1A shows an image plate and a first embodiment for a protective sheath of the invention with the image plate partly extracted from the protective sheath, viewed from the back of the image plate in the direction perpendicular to the plane of the image plate from a direction 1 in FIG. 1B.
Figure 1B:
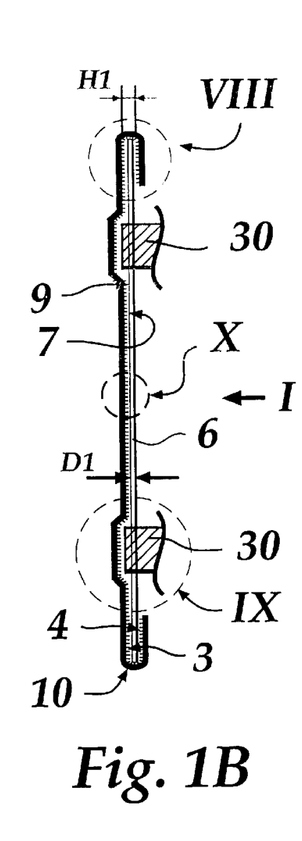
FIG. 1B is a cross-section of the combination of an image plate and a protective sheath of FIG. 1A along a plane II—II in FIG. 1A.

According to a preferred embodiment of the invention, the number of second sheet sections is two, i.e. the sheet sections 2a, 2b, as depicted in FIGS. 1A–B and 3A–B. These second sheet sections include mutually facing inner edges 12a, 12b which provide at least a small gap W2, enabling the use of e.g. a mechanical transfer element 30 for pushing the image plate thereby at least outwards P1 from the protective sheath 10. Thus, the element 30 or elements 30 are able to travel between the inner edges 12a and 12b throughout a protective-sheath length L2, resulting in a simple and functionally reliable transfer mechanism. A distance W2 between the inner edges 12a, 12b of the second sheet sections is at least about 30% of the width of the image plate 6 and preferably at least about 50% of the width of the image plate. Typically, this distance W2 is 70%–90% of the width W3 of the image plate 6. Since there is a large distance W2 between the inner edges of the sheet sections, whereby it can also be made as large as possible with respect to the width W3 of an image plate, yet smaller than the width W3 of the image plate 6, it is possible to effect a transfer of the image plate 6 by means of at least two or more elements 30 distributed across the width W3 of the image plate, as depicted in FIGS. 1A–1B. Since a distance W4 between the elements 30 is large, i.e. the elements furthest from each other are close to the opposite edges of an image plate and, hence, close to the attachments 8 between the sheet sections, the image plate 6 can be pushed thereby outwards P1 or possibly also inwards P2, such that the pushing direction is very accurately parallel to an image plate length L3 and at the same time parallel to the attachment 8 of the edges of a protective sheath, whereby the image plate does not tend to turn in the protective sheath into an inclined position but slides in and out without problems.

Figures 2B, 2C, 3B:
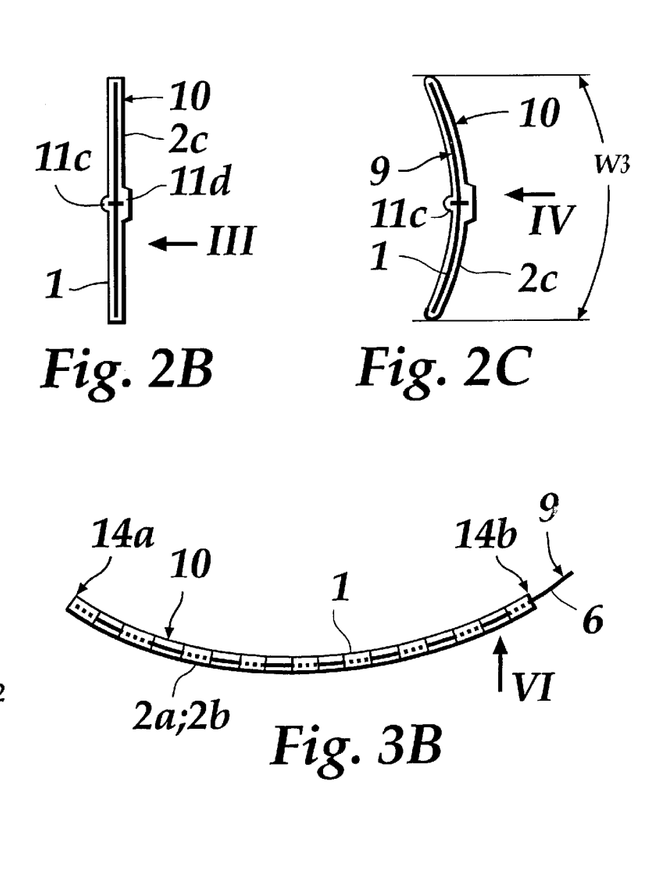
FIG. 2B shows in the direction of an image plate the combination of a second protective-sheath embodiment and an image plate of FIG. 2A from a direction V in FIG. 2A.
FIG. 2C shows in the direction of an image plate the combination of a third protective-sheath embodiment and an image plate of FIG. 2A from a direction V in FIG. 2A.
FIG. 3B shows in the direction of an image plate the combination of a fourth protective-sheath embodiment and an image plate of FIG. 3A from a direction VII in FIG. 3A.
Figure 3A:
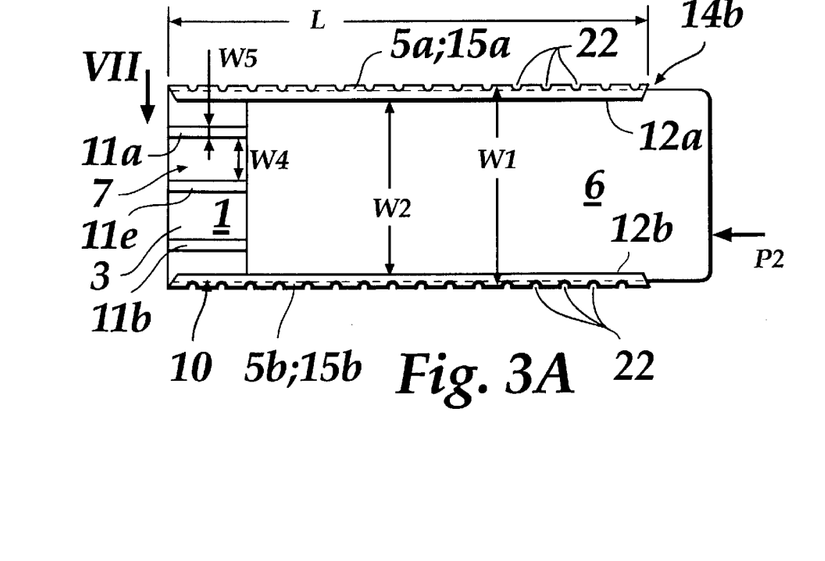
FIG. 3A shows an image plate and a fourth embodiment for a protective sheath of the invention with the image plate partly inserted, viewed from the back of the image plate in the direction perpendicular to the plane of the image plate from a direction VI in FIG. 3B.
Figure 5:
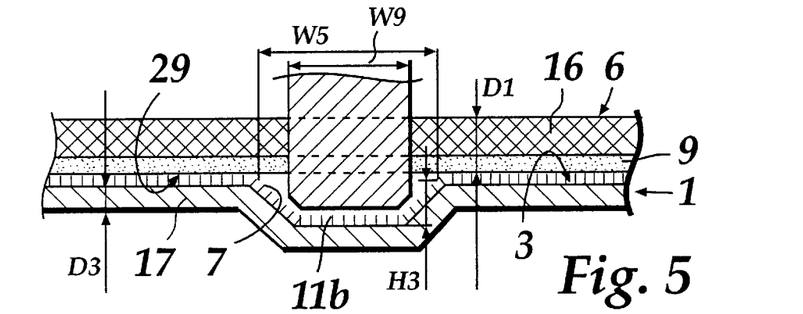
FIG. 5 shows a mid-section for the first embodiment of a protective image-plate sheath in line with a transfer means in a cross-section, a detail IX in FIG. 1B, in an enlarged scale.

Across the distance W2 between the inner edges 12a and 12b of these second sheet sections 2a–b, the first sheet section 1 is also provided with at least two chutes 11a and 11b or 11a, 11b, 11e parallel to the attachment 8 of fastening edges 5a–b, 15a–b and extending away from the second sheet sections 2, as shown in FIGS. 1A–1B and 3A. These chutes 11a–b and possibly 11e and possibly even a larger number of chutes are intended to provide a slight clearance for the pushing elements 30 in the image plate thickness direction D1, whereby the dimensioning and alignment of the elements 30 need not be absolutely precise during operation. This is conceivable when studying e.g. FIG. 5, wherein the pushing element 30 is in the process of urging the image plate 6 in the direction perpendicular to the image plane away from the viewer and the element 30 extends across the entire thickness dimension D1 of the image plate 6 and slightly downwards therefrom over to the side of the first sheet section 1 and to the chute 11b. The pushing element 30 has a width W9 which is slightly less than that W5 of the chute. A protective sheath of the invention can of course be used also without such described chutes, the first sheet section 1 being straight (FIGS. 1A–B) or, as subsequently described (FIGS. 2C and 3B), curved, but in this case, the dimensioning of the pushing elements 30 and the positioning and movement thereof must be highly accurate to hit only the thickness D1 of the image plate 6.

In a typical case, the number of these chutes included in the protective sheath 10 is equal to the number of pushing elements 30 in a currently employed reader. In order to effect the pushing of the image plate 6 in a lengthwise direction L3 of the attachment 8 of the edges 5a–b, 15a–b of a protective sheath and of the image plate, a distance W4 or distances W4 between the pushing elements 30 and, thus, between the chutes is or are at least about 15%, preferably at least 25%–60% of the image plate width W3, which is transverse to the image plate length L3 and directions P1, P2. The distance(s) W4 between the chutes can also be designed as large as possible, but in the cases of FIGS. 1A–B and 3A–B, wherein the inner edges of the second sheet sections have a distance W2, the total distance or total distances therebetween is or are preferably less than the distance W2 between the inner edges of the second sheet sections. For large-size image plates dealt with in the invention, the second sheet sections have a width W6 which is typically 0.5 cm–5 cm and the chutes have a depth H3 which is as small a dimension as possible beginning from the first surface 3, which allows the movement of an element hitting the edge of the image plate 6 and transferring the image plate at least outwards B2. Typically, this depth dimension H3 of a chute is 0.5 mm–1.5 mm, allowing therethrough essentially no latent-picture contained image information destroying light to the radiation- and light-sensitive surface 9. If it is necessary to employ a protective sheath in conditions with abundant ambient lightness, it is thus possible to exclude the chutes 11a, 11b, 11e, whereby the first sheet section 1 is substantially straight but, in this case, the movement of the elements 30 must be adapted to occur in precise alignment. In principle, there is nothing to prevent the removal of an image plate from a protective sheath of the invention manually as well, especially when it is provided with two second sheet sections 2a–b, whereby the image plate 6 has a vacant back to allow handling of the image plate. However, this is not recommendable for safety reasons, at least when effecting the reading of an image plate by means of a drum scanner, which may be running due to a malfunction or fault.

Figure 2A:
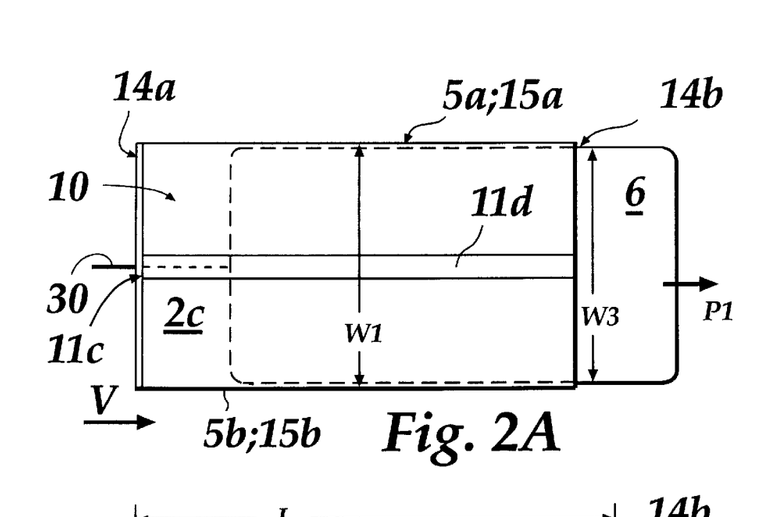
FIG. 2A shows an image plate and a second and a third embodiment for a protective sheath of the invention with the image plate partly extracted, viewed from the back of the image plate in the direction perpendicular to the plane of the image plate from directions III and IV. respectively, in FIGS. 2B and 2C.

Thus, the width dimension W3 of an image plate generally includes at least one element 30 for pushing the image plate 6 into a space 20 between the first sheet section and the second sheet sections inwards and from said space outwards, as shown in FIGS. 2A–2C. However, this embodiment involves a risk, which is nevertheless a reasonably minor risk when using the protective sheath 10 of the invention, that the image plate 6 urges to turn askew and, thus, it may keep getting caught during pushing actions. FIGS. 2A–C also depicts the features of that embodiment of the invention, which only employs a single second sheet section 2c, hence the second sheet section being also continuous the same way as the first sheet section. In this case, the pushing element 30 must be shaped like a rod having a sufficient length to push an image plate throughout its length L3 both into the protective sheath inwards P2 and from the protective sheath outwards P1, as conceivable on the basis of FIG. 2A. Most often, in this case, both the first sheet section 1 must be provided with a chute 11c and the second sheet section 2c with a chute 11d for the pushing element 30. In this case as well, it is possible to design the first sheet section 1 without a chute, but usually it must be included in the second sheet section 2c. Even in this case, however, there is nothing to prevent the exclusion of both chutes, whereby the pushing element 30 may preferably comprise a plate-like element, not shown in the figures and being of a size equal to the image plate thickness D1 and its width W3 or slightly narrower than the latter. This embodiment is well adaptable for use in such a case that the image plate 6 must be curved in its lateral direction W3, as shown in FIG. 2C. Thus, the protective sheath, being made of a rigid material as pointed out above, is capable of retaining at least partially the image plate in a desired format. In the case of FIG. 2C, on the other hand, the image plate is straight in the direction perpendicular to the plane of the figure.

According to one embodiment of the invention, the protective sheath 10 can be provided with recesses 22 in the direction perpendicular to the plane intended for the image plate 6 and included in the attachment 8 between the edges 5a–b of the first sheet section 1 and the edges 15a–b of the second sheet sections, as shown in FIGS. 3A and 3B. Thus, the image plate is insertable in a straight condition into the space 20 between the first sheet section or the second sheet sections with the latter in a straight condition, as evident from FIG. 3A. When the image plate 6 is in its proper position within the protective sheath 10, said image plate together with its protective sheath can be bent in the direction of the image plate length and the protective sheath length L3, L2 to a curved condition, as depicted in FIG. 3B. Thus, in the case of FIG. 3B, the image plate is bent to a curved shape e.g. around such a line which is parallel to the image plate surface and spaced from the image plate but perpendicular to the image plate length L3. In the case of FIGS. 3A and 3B, the image plate along with its protective sheath can be handled and stored while in a straight condition, which saves a considerable amount of space and is both safer and easier. Bending of the image plate and its protective sheath to a curved condition is only effected upon fitting the same in an imaging cassette or directly in an imaging apparatus.

In all above-described chute designs, it is appropriate that the chute or chutes have a width W5 which is no more than about 25% and preferably no more than 5–15% of the image plate width W3 in order to allow as little as possible of image-information destroying or confusing light to the radiation- and light-sensitive surface 9 of an image plate. This very minimization of lightness is also contributed to by a chute depth H3 which is as small as possible, as described above. The chutes have a width which is preferably 2–25 mm, typically 5–10 mm. Generally, it is not prudent to design the chutes and, hence, the pushing elements 30 to be narrower than this, since in that case, the image plate edge may be exposed to unnecessarily powerful spot- like forces. Thus, in the case of FIGS. 2A–2C, the pushing element 30 may comprise a plate-like element perpendicular to the plane of FIG. 2A, but its thickness in the lateral direction W3 of an image plate must exceed the above- mentioned 2 mm. In the case of FIGS. 1A–1B, it is clearly obvious that the elements 30 have a width W9 which is close to the width W5 of the chutes.

Figure 4A:
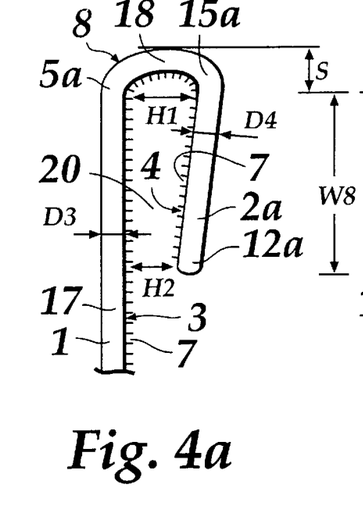
FIG. 4A shows a first feasible edge design for the first embodiment of a protective sheath for an image plate, viewed from the end of the protective sheath, a detail VIII in FIG. 1B, in an enlarged scale and with the image plate removed.

Typically, the width W1 between the outer edges 5a, 5b of the first sheet section, which is measured between the facing inner edges of a lateral space S of the attachment 8, is either equal to the total width W3 of the image plate 6 or a small measure larger than the total image plate width, such that the image plate slides between the edge attachments 8 of the first and second sheet sections with a suitable clearance, which does not, however, allow the image plate to turn substantially askew. This design is useful both in the case that the radiation- and light-sensitive surface 9 of the image plate 6 extends all the way to the image plate edge and in the case that the image plate is provided with a collar 19 made of a material other than the radiation- and light-sensitive coating, such design being depicted in FIGS. 4C and 1A. In case the image plate 6 is provided with some sort of collar 19, serving e.g. as a protective frame, the width W1 of the first sheet section can be limited just to be equal to the width W6 of the radiation- and light-sensitive surface 9, the first sheet section being provided across this width with a finish resisting the damaging, such as scratching, of the radiation- and light-sensitive surface of an image plate and at the same time protecting from light. Thus, the image plate collar 19 can be allowed to travel in some non-illustrated edge groove of the protective sheath, which need not be provided with a coating of the invention preventing damage of the radiation- and light-sensitive surface. However, such an edge groove can be provided with e.g. this type of an anti-scratching and/or low-friction coating. According to the present understanding, however, it is most preferable to design the first width W1 of the first sheet section 1 to be of a size equal to the width W3 of the entire image plate 6. In this case, the protective sheath can be manufactured in a single sheet element, as subsequently described.

As can be appreciated from the figures, a gap 20 between the first sheet section 1 and the second sheet section 2c or, respectively, the second sheet sections 2a, 2b is open across the entire width of ends 14a, 14b thereof, i.e. across the entire width W3 of an image plate. These ends 14a, 14b are lateral and typically perpendicular to the edge attachment 8 of the sheet sections 5a–b, 15a–b. This way, the image plate 6 can be slid within the gap 20 between the sheet sections through either one of the ends 14a or 14b either outwards P1 or inwards P2.

The first surface 3 in the protective sheath 10 of the invention is provided with a coating 7 protecting the radiation- and light-sensitive surface 9 of an image plate at least against damage such as scratching. In addition, this coating is typically one to prevent the mutual sticking of an image plate and a protective sheath, i.e. the coating 7 is preferably able to establish also a relatively low friction and/or adhesion between the radiation- and light-sensitive surface of an image plate and a protective sheath. The coating 7 is preferably a flocky layer, at least over the first surface 3 of the first sheet section 1 or at least over that section of this surface 3, along which travels the radiation- and light-sensitive surface 9 of the image plate 6, especially the outer face 29 thereof. Generally, this flocky layer, protecting the radiation- and light-sensitive surface against damage, such as scratching, and possibly also reducing friction, is also laid on said second surface 4 of the second sheet sections or second sheet section. The benefit gained by such a flocky layer is not only the fact that it reduces the friction of the surface of an image plate relative to a protective sheath but also that it resists the attrition and scratching of the radiation- and light-sensitive surface 9 of an image plate and moreover, being made of a material black in colour, the flocky layer is also effective in blocking the access of light or other harmful radiation through the ends 14a, 14b to the radiation- and light-sensitive surface 9 of an image plate. It has been confirmed in practice that, if the image plate is not provided with protective edges but the radiation- and light-sensitive surface 9 extends all the way to the edge of the image plate and the protective sheath has a length L2 equal to that L3 of the image plate and the image plate is placed in accordance with the invention within this protective sheath in such a fashion that the sensitive image plate surface 9 lies against the first surface 3 of the first sheet section 1 provided with the flocky black coating 7, the normal office lighting only erases image at the end edges of the image plate over a very narrow strip. This strip containing partially destroyed image information has a width of considerably less than 1 mm and generally well less than 0.5 mm. Thus, the flocky coating 7 used in a protective sheath of the invention as a layer resisting the attrition and scratching of the radiation- and light-sensitive surface 9 of an image plate functions excellently for protecting the sensitive image plate surface and for bringing the image plate without damaging it into and out of the protective sheath. The anti-friction effect of the flocky coating 7 reduces further the image plate damaging risk, since the image plate has no tendency of getting stuck or caught on the protective sheath as a result of a low friction and a low adhesion therebetween.

Figures 6A, 6B:
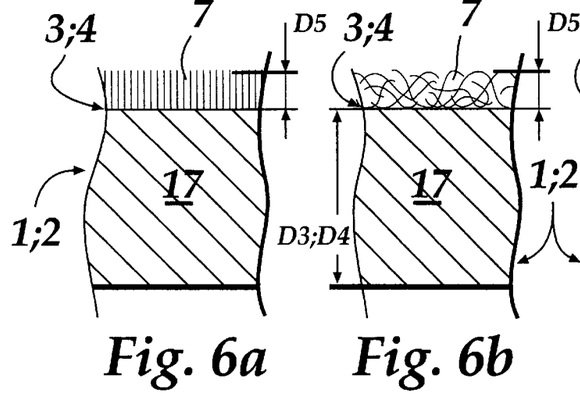
FIGS. 6A–6C show a detail X in FIG. 1B for depicting structural layers in a material for a protective sheath of the invention in a cross-section and in a substantially enlarged scale.
Figure 6C:
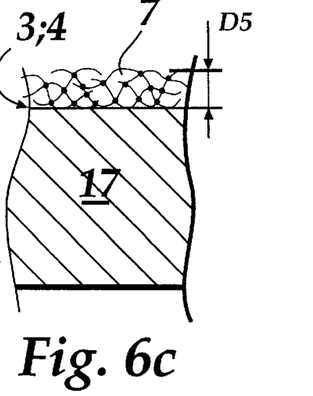
Figure 8A:
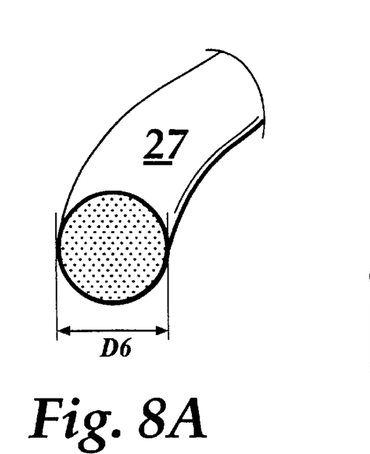
FIGS. 8A–8B illustrate various feasible shapes for fibers included in a coating which reduces friction in a protective sheath of the invention, especially cross-sectional shapes in a highly enlarged scale.
Figure 8B:
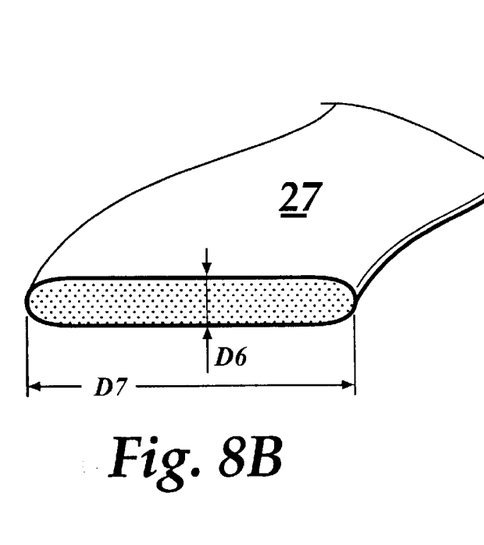

The above-described flocky coating 7 consists of elastic fibers 27, which may be constituted by natural fiber, synthetic fibers or combinations thereof. The fibers 27 may have a length which is substantially equal to a fluffy- layer thickness D5, these short elastic fibers 27 being attached to a base material 17 of the sheet sections mainly at one end thereof. This produces a velvet type of fluff or pile as schematically shown in FIG. 6A. The elastic fibers 27 may also have a length which substantially exceeds the thickness of the flocky layer, said length being preferably at least about one and a half and typically no less than double or triple with respect to the thickness of the flocky layer, but it can be even considerably longer. In this case, these long elastic fibers are attached to the base material of the sheet sections at least at one point and, when particularly long, the fibers can be attached to the base material 17 at several points to produce a bunch of wavy fibers. This type of flock or pile structure is shown in FIG. 6B. In such a wavy-fiber constituted flock, the fibers may extend relative to each other in random orders or be specifically organized. One example of such latter type of flocks includes terry type of flocks. Furthermore, when the elastic fibers are long as described above, said fibers can be attached not only to the base material 17 but also to each other at the crossing points thereof. This results in a three-dimensional web-like or spongy flock layer, as schematically shown in FIG. 6C. These individual elastic fibers 27 may have a cross-section which is circular, as shown in FIG. 8A, or elliptical or flat, as shown in FIG. 8B, whereby the ratio between two relatively transverse diameters D6 and D7 of the fiber 27 can be very high indeed. The individual elastic fiber 27 has a thickness D6 and/or D7 which is substantially less than that D5 of the fluffy or pily layer and preferably no more than about 20% and typically no more than 5–10% of the layer thickness. Depending on the fiber material and the density of fibers 27, the thickness thereof may be even less. Thus, at least one of the thickness dimensions D6 and/or D7 of an individual fiber is generally less than 200 $\mu$m, preferably less than 100 $\mu$m and typically within the range of 50–10 $\mu$m. The fibers have preferably a low hardness and a high elasticity. Thus, the fibers must have an effective hardness sufficiently low not to scratch the sensitive image-plate surface 9. The fibers must not deform plastically as a result of compression caused by the image plate, but must return as precisely as possible to the original shape thereof after the image plate is removed from the gap 20 between the sheet sections. The fiber material itself is preferably as little as possible transmissive to and reflective of light, such as the stimulating radiation used in the reading of an image and the radiation performing the erasion of an image plate, and generally black in visual examination. Thus, by way of the coating 7 through the pile fibers 27 and between the fibers 27, as little as possible of image-information destroying radiation, such as light, is able to reach the coating-contacting radiation- and light-sensitive surface 9 of the image plate 6.

As pointed out above, the flocky layer 7 comprises fibers which may consist of elastic natural fibers. examples of such including silk fiber and cellulose-based fibers, such as cotton, hemp, manila, bastose etc. Also useful are keratine-based natural fibers, such as various wools. Another possibility is to employ elastic synthetic fibers, consisting of some polymer, a blend of various polymers, or a copolymer. The basis of such artificial fibers can be cellulose or pulp for producing so-called viscose fiber, or cellulose acetate, generally a cellulose derivative. Fibers can also be made of polyurethane, polyamide, polyester, polyacrylic compounds or polyvinyl compounds, which include e.g. polyethylenes, styrene polymers, polyvinyl chloride, polyvinyl acetate and polyvinyl alcohols. Furthermore, synthetic fibers can be made of proteins. It is obvious that synthetic fibers can also be produced from a blend of the above-mentioned polymers and/or copolymers, or it is possible to blend already finished fibers based on various polymers with each other. Similarly, it is possible to blend various natural fibers with each other as well as synthetic fibers and natural fibers with each other. Natural fibers must be dyed black by some suitable means as described above unless they are black by nature, while synthetic fibers are most preferably made black by admixing some suitable colorant in the synthetic fiber base material prior to manufacturing the fibers. Even synthetic fibers can be dyed, but the resulting darkness and colour stability are generally poorer than what is achieved by mixing the colorant in the actual plastics material. In theory, it is possible that the fiber material in itself is sufficiently dark or black for the absorption of light in a desired degree. However, the fiber material must be sufficiently, or most preferably as highly transmissive as possible to radiation used at any given time in the exposure of an image plate, such as X-radiation.

According to the invention, the sheet sections 1, 2a–2b, 2c consist of a continuous piece of plastics material and most preferably a plastic sheet element, one surface of which is provided with the above type of flocky coating 7, protecting the radiation and light-sensitive surface of an image plate against damage and not allowing light therethrough in the direction of said coating 7, i.e. in the direction of the first surface 3, in such a degree that the quality of a latent picture on the image plate would be essentially impaired. This plastic material is preferably through-dyed e.g. black by means of a suitable dyestuff so as to be as highly transmissive as possible to the radiation used for the exposure of an image plate, but non-transmissive to such radiation which erases the image information from the image plate or to such radiation which is used for stimulating the image plate when reading the image information. This non-transmissivity to the image-information erasing radiation and stimulating radiation, i.e. generally light, need not be absolute, but just sufficient. The purpose is to preclude these radiations to such a degree that the latent picture of an image plate remains after exposure imaging, such as X-ray imaging, in an immaculate condition for reading the image plate. In theory, it is possible that the plastic sheet material in itself be sufficiently dark or sufficiently black for the absorption of light to a sufficient degree. Hence, in the most typical case, the material of a plastic sheet 17 must be transmissive to X-radiation or to wavelengths within a nearby range but must not be transmissive to visible light, nor to infrared radiation within a nearby range or to ultraviolet radiation. However, as mentioned above, these transmissivities and non-transmissivities must be adapted to the sensitivities of any given type of image plate.

Figure 4B:
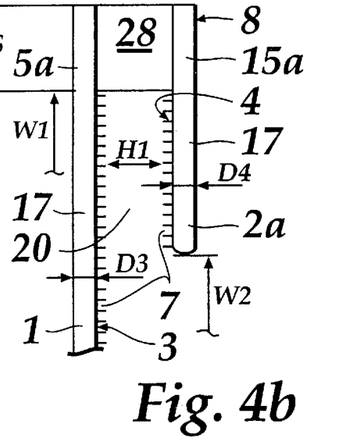
FIG. 4B shows a second feasible edge design for a protective sheath of the invention, viewed from the end of the protective sheath the same way as in FIG. 4A with the image plate removed.
Figure 4C:
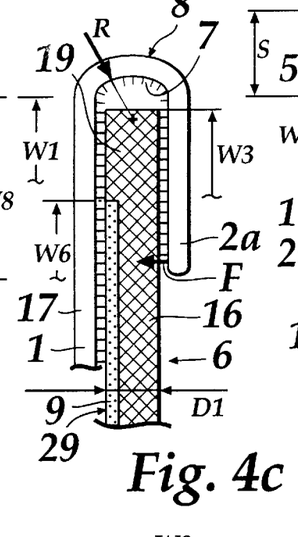
FIG. 4C shows the edge of a protective sheath of FIG. 4A with the image plate inserted in place.

The plastic sheet 17 constituting a base material for the sheet sections 1, 2a–2b, 2c can be made of thermosetting plastic, whereby attachment of the edges 5a–b, 15a–b of the sheet sections to each other must be effected e.g. by sizing or welding with the use of a strip 28 having a thickness roughly equal to that of the image plate, as shown in FIG. 4B. It shows an end view of the edge strip 28 and the sheet sections 1 and 2a, or respectively 2b, secured on either side of this strip. More preferably, however, the material of the plastic sheet 17 comprises thermoplastic, such as some polyolefine or a copolymer thereof, including e.g. polyethylenes and polypropylenes. It is also possible to use vinyl polymers, such as polyvinyl chloride (PVC), or polyvinyl alcohols or acrylic polymers, such as PMMA, PAN, and PMA. Likewise, it is possible to use condensation thermoplastics, including polyesters, polyamides, polyurethanes (PU), polycarbonate, and polyethers. It is further possible to use styrene polymers, such as impact resistant polystyrene, or combination polymers thereof with other polymers, which are known by abbreviations like ABS, SAN, and ASA. The plastic sheet 17 can also be produced by using compositions of the above plastics or by laminating suitable layers of plastics on top of each other.

In order to fit an image plate together with its protective sheath in a normal or desired film cassette without any problems either with no modifications at all to the cassette or with modifications as insignificant as possible and to simultaneously execute the pushing of the image plate in and out of the protective sheet in a desired fashion, the sheet sections have thicknesses D3 and D4 as small as possible. However, these thicknesses D3 and D4 of the sheet sections must be such that the protective sheath 10 is given a sufficient rigidity in order to transfer the image plate into and out of the gap 20 between the sheet sections 1 and 2a–b, 2c without the protective sheath experiencing troublesome deformations during the course of pushing the image plate inwards P2 and outwards P1. Hence, the protective sheath can be completely stiff, which means that it is not at least very easy to deflect as a person handles it normally. Also, there is no reason why the protective sheath could not be made sufficiently sturdy and stiff to withstand even rough handling by a person. Of course, the protective sheath having such a rigidity is only suitable for use in its original manufactured condition and, thus, it is not adaptable to the embodiment of the invention shown in FIGS. 3A–3B, which requires the use of a flexible protective sheath. Normally, however, there is no reason to make a protective sheath of the invention this stiff, but generally the protective sheath can be flexible, i.e. manually pliable by a person, as long as the protective sheath has a sufficient rigidity for the pushing of an image plate in between the first sheet section 1 and the second sheet section 2c or second sheet sections 2a, 2b not to result in detrimentally affecting deformations in the protective sheath. Therefore, the protective sheath must be made of such an elastic or flexible material, which brings the protective sheath, when released after a possible bending, other deformation or strain, to spring essentially back to its original form. At any rate, the protective must not be such that it could deform plastically in operating conditions to a distinctive degree at least as a result of its own weight. Thus, as pointed out above, the protective sheath 10 is reasonably rigid, but to some extent elastically flexible. Hence, the protective sheath retains its shape when it is not handles, but is pliable by a manual force and returns essentially to its original condition as the bending force is released. So the material for sheet sections 1, 2a–2b, 2c exhibit a certain resiliency so that the range of material property from stiff to elastically flexible describes the variation of force required to bend the sheath material with predetermined thickness. Therefore, the material of the plastic sheet 17 for said sheet sections must preferably be as rigid or stiff as possible and at the same time as thin as possible. This is the case at least in such application of the invention, wherein an image plate together with its protective sheath is fitted in a conventional imaging cassette, as subsequently described in more detail. Thus, the thicknesses D3, D4 of the plastic material, such as the plastic sheet 17, for the sheet sections 1, 2a–b, 2c are no more than about 3 mm, preferably no more than about 2 mm, and typically within the range of 0.4 mm–1.5 mm. Said flock layer 7 is laid on top of this plastic sheet 17 and the flocky layer in turn has a thickness D5 which is no more than equal to and preferably substantially less than the above-mentioned thicknesses D3, D4 of the sheet sections, such as plastic sheets 17, functioning as an attachment base therefor. Typically, the thickness D5 of the flocky layer 7 is thus less than about 25% of the sheet material thickness D3 and/or D4, but often less than that, such as 10% or 5% of the plastic sheet thickness D3, D4. In case the flocky coating 7 possess some inherent strength to increase rigidity of the sheet sections 1, 2a–2b, 2c, it may possibly have a thickness exceeding that mentioned above.

The present conception is that, in the most preferred embodiment for a protective sheath of the invention, the attachment between the edges 5a–b, 15a–b of the sheet sections is effected at a sheet folding point 18, for which reason the use of thermoplastic in the form of the plastic sheet 17 as a base material for the sheet sections is advantageous. In addition to this, it is considered beneficial that a distance H2 between the facing edges 12a, 12b of the second sheet sections and the first sheet section whenever the image plate is not fitted in the gap 20 between the first and second sheet sections, be less than the image plate thickness D1. When, in addition to this, the thicknesses D3, D4 of sheet sections are selected sufficiently large and the material is selected in such a way that the material for the sheet sections will be sufficiently stiff and elastic, these second sheet sections and particularly the edges 12a and 12b thereof apply to the image plate 6 in the gap 20 between the sheet section such a compression F, i.e. a force in the direction perpendicular to the plane of the image plate, that the image plate has at least no major inclination or drift due to its own weight to slide in a vertical position out of this gap 20. This facilitates the handling of an image plate as the latter is placed in a protective sheath, since the image plate has at least no major inclination to creep out of the gap 20 if the operator turns the image plate and its protective sheath to a position wherein the lengths L2 and L3 are vertical or approximately vertical.

Figure 7A:
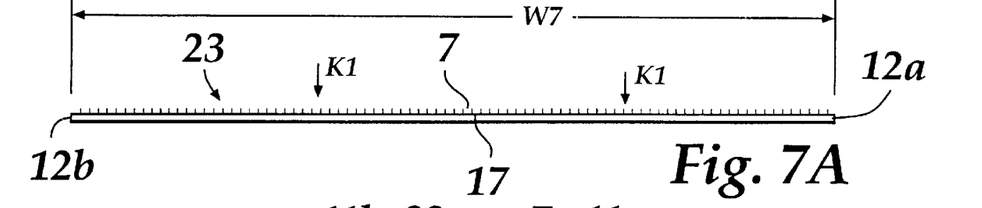
FIGS. 7A–7C depict various operations in a preferred protective-sheath manufacturing method of the invention in sequence.
Figure 7B:
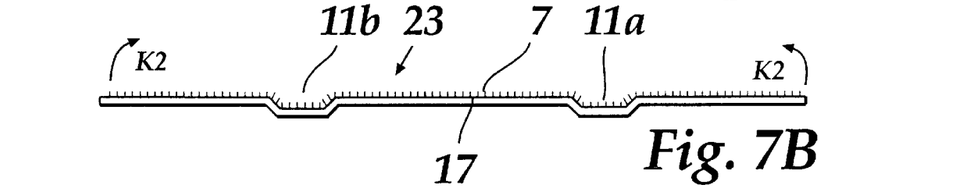
Figure 7C:
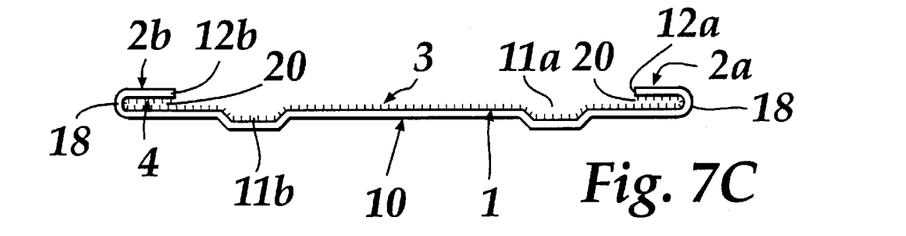

According to the invention, a protective sheath of the invention is preferably manufactured as follows. The starting material comprises a thermoplastic sheet 17 provided with a flocky coating layer 7 of the type described above. Such a sheet material 23 is cut to form an element, having a length L2 which is at least equal to that L1 of the sensitive image plate surface 9, but generally equal to an entire image plate length L3. The element of sheet material 23 has a width W7 which substantially exceeds a total width W3 of the image plate. Thus, this width W7 of the element 23 is approximately equal to the image plate width W3 and a desired width W8 of the second sheet sections doubly added together and, hence, generally 20%–60% more than the image plate width L3 and, in terms of absolute dimensions, it is generally 1–10 cm wider than the image plate 6 or some other value calculated according to the above dimension. This is followed by pressing K1 the sheet material 23 to provide desired chutes, such as chutes 11a and 11b, as shown in FIG. 7B in case the chutes are desired in the protective sheath over the first sheet section. When pressing the chutes 11a–b, 11e or 11c, the pressing K1 is performed in the direction extending from the pile coating towards the thermoplastic base material. The width and disposition of these chutes must be arranged so as to set the same at a desired location in a finished protective sheath, as described above. If such are desired in the protective sheath, these chutes must be pressed at this point as they take up a small portion of the original sheet material width W7, as conceivable in reference to FIGS. 7A and 7B. Thereafter, or right at the start if no chutes are pressed, both laterally opposite edges 12a and 12b of the sheet material element 23 are bent K2 to form second sheet sections 2a, 2b extending beyond the image plate width W3, such that these extreme edges of the second sheet sections face towards each other and the pile coating 7 of the sheet material shall end up on the concave side of a thus resulting fold 18. Thus, the second sheet sections 2a, 2b are produced from the same material as the first sheet section 1 by folding the edges of the element of sheet material 23 around a bending radius R at least 180°, as conceivable from FIGS. 4A and 4C. The bending radius R is approximately twice the image plate thickness D1. If the bending over the radius R is slightly more than 180°, the edges 12a, 12b of the second sheet sections 2a, 2b will set at a distance H2 from a first surface 3 of the first sheet section 1, said distance H2 being slightly less than the image plate thickness D1. This bending result is shown in FIG. 4A and it results in the above-described slight compression of the image plate 1 with a force F against the first sheet section. The use of thermoplastics as the plastic sheet 17 serving as a base for the starting material is preferred for the reason that the chutes 11a, 11b and especially the lateral folds 18 are produced therefrom relatively easily by heating the material by some suitable means over the areas to be folded. Other parts of the starting material sheet 23 need not be subjected to any force during the course of bending and, thus, especially the first sheet section remains in an immaculate condition, regardless if the area of the folds 18 were subjected to even an intense heating to maybe cause damage to the pile coating in this area.

A protective sheath of the invention as described above has been tested by designing such from a material available under the name "THERMODET", which is a trademark registered by a company: Mitras Kunststoffe GmbH. According to the available information, the employed material is of the type "flock–schwarz 5551", wherein the base material comprises some polystyrene, according to the brochure. Material for the fluffy coating has not been disclosed by the manufacturer, but in visual inspection. the coating consists of some sort of fibrous texture.

On the basis of what is already described above, the protective image plate sheath 10 of the invention is operated as follows. After erasing the radiation- and light-sensitive surface 9 of the image plate 6 to remove therefrom possible traces or information left by previous imaging and ghost images developed by possible background radiation under a powerful radiation source, the image plate is pushed inwards P2 in the protective sheath 10 into the gap 20 between the first sheet section and the second sheet section or sections 2a–b, 2c in the direction of the relative attachment 8 between the lengthwise edges 5a–b, 15a–b, i.e. the length L3 of an image plate parallel to the length L2 of a protective sheath, with the sensitive image plate surface 9, i.e. the outer face 29 of the sensitive surface, against the first sheet section 1, and particularly against the flocky coating 7 laid on top of the first surface 3 of the first sheet section. This is followed by placing the image plate together with its protective sheath in an imaging cassette, which can be a conventional film cassette or some other cassette. This imaging cassette is in a normal manner insertable in an imaging apparatus, whereafter the exposure of an image can be performed e.g. with X-rays and the cassette can be normally removed from the imaging apparatus. Thereafter, the imaging cassette is opened and the image plate, along with its protective sheath, is transferred to an image plate reader. Alternatively, the image plate, positioned within the protective sheath, can be fitted directly in that condition in an imaging apparatus, whereafter the exposure of an image can be executed e.g. with X-rays and the image plate with its protective sheath can be removed normally from the imaging apparatus. All of the above operating sequences can be performed in a normally lighted room or in a room lighted to such a degree that the operator is able to see this procedure. Thereafter, the image plate 6 is pushed outwards P2 from the gap 20 between the first and the second sheet section or sections in the direction of the attachment edges thereof and further to a reading apparatus. In case this mechanism transferring an image plate to a reading apparatus is unprotected, the room or this section of the room must be darkened to a sufficient degree in order not to lose the latent image on the image plate. However, this presents no problem as the reading apparatus normally contains an automatic mechanism in which the transfer elements 30 described previously in this application are included. However, the placing of an image plate and its protective sheath in a reading apparatus can be effected in the light, whereby even the accurate procedure is not a problem. In most cases, however, the reading apparatus and a mechanism transferring the image to the reading apparatus are encapsulated and, thus, it is sufficient to close the cover of the apparatus.

If it is desirable to operate without the actual imaging cassette, the image plate 6 within the protective sheath 10 being placed directly and without a cassette in an X-ray apparatus or in some other such exposure imaging apparatus, the protective sheath of the invention may comprise a protective sheath otherwise of the above type except that the material constituting the sheet sections 1 and 2a–b, 2c for the protective sheath 10 can generally be thicker and occasionally it is even preferred that such material be thicker than what was previously mentioned in this description. Thus, it is often possible to employ a plastic sheet, having a thickness of 2 mm–3 mm or even 5 mm or more. In this case, a particularly applicable embodiment for the protective sheath is the one shown in FIG. 4B. Especially in this case, the first sheet section 1 and the second sheet section 2c or second sheet sections 2a, b can be made of a material with unequal thicknesses, e.g. for setting the radiation- and light-sensitive image plate surface at a desired point in the direction perpendicular to the plane of the image plate. What has been described earlier in this application applies to all other dimensions.

Instead of the second sheet section or second sheet sections, it is possible to provide the back of an image plate, i.e. the side facing away from the radiation- and light-sensitive surface 9, with a type of base element other than sheet material. The base element or base elements corresponding to the sheet sections can be designed for example from strips of a suitable material, spring-fitted strips, or other elastic elements, which are not actually shown in the figures except that, in reference to FIG. 4B, it is conceivable that the sheet section 2a is readily replaceable with another type of element, which urges the image plate 6 from its back towards the first sheet section 1. After all, this is the essential function of the second sheet sections or second sheet section or some other base element. In such an embodiment, and especially if the image plate is provided with non-sensitive edges 19 or the image plate edge sections are otherwise unnecessary, the second sheet sections 2a and 2b need not necessarily be made of a radiation-transmissive material or texture used in imaging, but may consist of any other appropriate material or structure.

I claim:

1. A protective sheath for use with an image plate to cover at least a radiation- and light-sensitive surface portion of the image plate, said protective sheath comprising: materials that are transmissive to radiation used in imaging and substantially non-transmissive to light; a continuous first sheet section having a first outer edge and a second outer edge opposite said first outer edge, said first sheet section being sized so as to cover the radiation- and light-sensitive portion of the image plate when positioned within said protective sheath; at least one second sheet section extending substantially parallel to the first sheet section, said second sheet section including oppositely facing outer edges, at least one of said second sheet section edges being secure with one of the two opposite outer edges of the first sheet section; a distance between a first surface of said first sheet section and an opposing second surface forming a gap into which the image plate can be inserted at a first end of said protective sheath for positioning between said first and second surfaces and from which the image plate can be removed at a second end of said protective sheath in a direction parallel to the length of said outer edges of said first sheet section, and at least said first surface including a coating for protecting the radiation- and light-sensitive surface of the image plate from damage when positioned within said protective sheath.

2. The protective sheath for use with an image plate as set forth in claim 1 wherein said at least one second sheet section includes two second sheet sections each having an inner edge facing toward the inner edge of the other second sheet section, said inner edges being spaced from each other by a distance.

3. The protective sheath for use with an image plate as set forth in claim 2 wherein said first sheet section includes at least one chute having a width located within the space between said inner edges of said second sheet sections and a longitudinal axis extending parallel to said outer edges of said first sheet section, and said at least one chute extending at an angle to its longitudinal axis in a direction away from said second sheet sections.

4. The protective sheath for use with an image plate as set forth in claim 1 wherein the other of said second sheet section edges is secure with the other of said outer edges of the first sheet section for covering the image plate when positioned within the protective sheath.

5. The protective sheath for use with an image plate as set forth in claim 1 wherein said at least one second sheet section includes said opposing second surface.

6. The protective sheath for use with an image plate as set forth in claim 1 wherein said first and second sheet sections are substantially stiff.

7. The protective sheath for use with an image plate as set forth in claim 1 wherein said first and second sheet sections are substantially flexible.

8. The protective sheath for use with an image plate as set forth in claim 2 wherein said distance between said inner edges of said second sheet sections is from fifty percent to ninety percent of a width of the first sheet section.

9. The protective sheath for use with an image plate as set forth in claim 3 wherein said first sheet section includes at least two chutes extending within the distance between said inner edges of said second sheet sections, said chutes each have a longitudinal axis extending parallel to said outer edges of said first sheet section, each said chute also extends at an angle to its longitudinal axis in a direction away from the second sheet sections, a center line of one of said chutes is spaced from a center line of an adjacent one of said chutes by a distance that is between about fifteen percent and sixty percent of the width of the first sheet section and less than said distance between said inner edges of said second sheet sections, and a width of each chute is between about five percent and twenty-five percent of the width of the first sheet section.

10. The protective sheath for use with an image plate as set forth in claim 8 wherein said distance between said inner edges of said second sheet sections is between seventy percent and ninety percent of the width of the first sheet section.

11. The protective sheath for use with an image plate as set forth in claim 9 wherein said distance between said centerlines of the adjacent chutes is between twenty-five and sixty percent of the width of said first sheet section.

12. The protective sheath for an image plate as set forth in claim 3 or 9 wherein each said second sheet section has a width which is in the range of about 0.5 cm to 5.0 cm; and each said chute has a width in the range of about 2.0 mm to 25 mm, and each said chute has a depth in the range of about 0.5 to 1.5 mm whereby said depth allows the image plate and a member for contacting the image plate to be moved out of said protective sheath.

13. The protective sheath for use with an image plate as set forth in claim 12 wherein each said chute has a width between about 5.0 mm and 10 mm.

14. The protective sheath for an image plate as set forth in claim 1 wherein said first and second ends of said protective sheath extend transverse to the outer edges of said first sheet section; and the gap at said first and second ends is maintained in an open position for enabling the image plate to be inserted into the protective sheath from the first end and removed from the protective sheath from the second end.

15. The protective sheath for an image plate as set forth in claim 1 wherein said first and second sheet sections include a bearing section formed of a plastic material for providing elastically rigid sheet sections; and said coating includes a flocky layer having a thickness, said flocky layer is positioned on at least said first surface of said first sheet section for reducing friction between the image plate and said rigid sheet section when the image plate is within said protective sheath.

16. The protective sheath for an image plate as set forth in claim 15 wherein said second sheet section includes a flocky layer.

17. The protective sheath for an image plate as set forth in claim 15 wherein the plastic sheet sections each have a thickness which provides substantial rigidity to said protective sheath for allowing the image plate to be inserted into said gap and removed from said gap, and the plastic sheet sections also include an elasticity for applying a compressive force to the image plate when positioned within the protective sheath.

18. The protective sheath for an image plate as set forth in claim 2 wherein said first and second sheet sections are secure with each other by an attachment strip, or by a bend of the first sheet section and the second sheet section, said bend being a same continuous material as said first and second sheet sections.

19. The protective sheath for an image plate as set forth in claim 15 wherein said plastic material is a through-dyed thermoplastic sheet that is substantially transmissive to radiation used for the exposure of the image plate, and substantially non-transmissive to radiation capable of erasing image information from the image plate and radiation used for stimulating the image plate when reading image information.

20. The protective sheath for an image plate as set forth in claim 19 wherein said thermoplastic material is an olefin polymer, vinyl polymer, acrylic polymer, styrene polymer, condensation polymer, copolymer or a combination of at least two of said polymers.

21. The protective sheath for an image plate as set forth in claim 19 wherein said thermoplastic material is a polystyrene, impact resistant polystyrene, ABS-plastic, SAN-plastic, ASA-plastic, PVC-plastic or PU-plastic.

22. The protective sheath for an image plate as set forth in claims 15 or 19, wherein said flocky layer is positioned on said plastic material, and said plastic material has a thickness of less than about 3.0 mm.

23. The protective sheath for an image plate as set forth in claim 22 wherein said thickness of said plastic sheet material is between 0.4 mm and 1.5 mm.

24. The protective sheath for an image plate as set forth in claim 15 wherein said flocky layer includes flexible natural fibers, flexible synthetic fibers or a combination of flexible natural and synthetic fibers, and the fibers of said flocky layer are attached to the first surface of said first sheet section so that portions of the fibers are not secured to the first surface of said first sheet section.

25. The protective sheath for an image plate as set forth in claim 24 wherein said fibers of said flocky layer are attached to the first surface of said first sheet section at only one point.

26. The protective sheath for an image plate as set forth in claim 24 wherein at least two fibers of said flocky layer cross each other at a location where said at least two fibers are secured together.

27. The protective sheath for an image plate as set forth in claim 24 wherein said natural fibers are silk fibers, cellulose-based fibers, keratine-based fibers or a combination of at least two of the natural fibers.

28. The protective sheath for an image plate as set forth in claim 24 wherein said synthetic fibers are polymer fibers, copolymer fibers based on cellulose derivatives, protein-based fibers or a combination of at least two of the synthetic fibers.

29. The protective sheath for an image plate as set forth in claim 15 or 24 wherein said flexible fibers of said flocky layer have a length that is substantially equal to or greater than a thickness of said flocky layer, each individual flexible fiber of said flocky layer has a thickness that is substantially less than the thickness of said flocky layer and said flexible fibers cooperate with said sheet sections to prevent radiation from erasing image information from the image plate and to prevent radiation from stimulating the image plate.

30. The protective sheath for an image plate as set forth in claim 29 wherein said length of said flocky layer is at least twice the thickness of said flocky layer.

31. The protective sheath for an image plate as set forth in claim 27 wherein the thickness of said flocky layer is substantially equal to or less than the thickness of the plastic material of the first sheet section to which the flocky layer is attached.

32. The protective sheath for an image plate as set forth in claim 15 wherein the thickness of said flocky layer is substantially equal to or less than the thickness of the plastic material of the first sheet section to which the flocky layer is attached.

33. The protective sheath for an image plate as set forth in claim 31 wherein the thickness of the flocky layer is between about five percent and twenty-five percent of the thickness of the plastic sheet material of said first sheet section.

34. The protective sheath for an image plate as set forth in claim 31 wherein said flexible fibers have a thickness of between about 200 $\mu$m and 10 $\mu$m.

35. The protective sheath for an image plate as set forth in claim 31 wherein said flexible fibers have a substantially circular cross section.

36. The protective sheath for an image plate as set forth in claim 31 wherein said flexible fibers have a substantially flat cross section.

37. The protective sheath for an image plate as set forth in claim 1 wherein said outer edges of said first sheet section and said at least one edge of said at least one second sheet section include recesses extending perpendicularly to a plane in which said first sheet section lies so that said protective sheath is bendable in a direction extending parallel to the length of said protective sheath.

38. A method for manufacturing a protective sheath of materials transmissive to radiation used in imaging but substantially non-transmissive to light for use with an image plate to cover at least a radiation- and light-sensitive surface on the image plate, said method comprising the following steps:

(A) providing a starting sheet material comprising a thermoplastic sheet having a flocky coating layer for protecting the radiation- and light-sensitive surface of the image plate from damage when the image plate is inserted within the protective sheath;

(B) cutting said starting sheet material to form an element having a first sheet section, laterally extending edges, a length for covering the light-sensitive image plate surface along the length of the image plate and a width for exceeding the width of the image plate;

(C) bending said starting sheet material at a location spaced from said laterally opposite edges to form second sheet sections for extending beyond the image plate width; and (D) positioning said edges so that they face towards each other and the flocky coating is located on an inner surface of the bends.

39. The method as set forth in claim 38 further including the steps of pressing the sheet material and forming at least one chute along the length of the sheet material, said chute extending away from the flocky coating layer in a direction of said thermoplastic sheet; and wherein said pressing and forming steps occur before said bending step.

40. The method as set forth in claim 38 wherein said bending step further includes bending the second sheet sections about a bending radius that is substantially equivalent to half of a distance between the first sheet section and one of said second sheet sections at a point spaced inwardly toward the bend from one of said laterally extending edges, each said second sheet section being bent such that it extends parallel to the first sheet section.

41. The method as set forth in claim 38 wherein said bending step includes bending the second sheet sections about a bending radius that is substantially equivalent to half of a distance between the first sheet section and one of said second sheet sections at a point spaced inwardly toward the bend from one of said laterally extending edges, each said second sheet section being bent so that it extends at an angle to the first sheet section and so that a distance between each said laterally extending edge and said first sheet section is less than twice said bending radius.

42. A method of using a protective sheath for an image plate to cover at least a radiation- and light-sensitive image surface on an image plate, said protective sheath including materials that are transmissive to radiation used in imaging but substantially non-transmissive to light for protecting a light-sensitive surface of the image plate at least from such radiation that is capable of erasing the latent image information from the image plate, as well as from radiation for stimulating the image plate when reading the image information, said method including the steps of:

(A) providing a protective sheath comprising a continuous first sheet section having a size at least equal to that of the radiation- and light-sensitive surface of the image plate, at least one second sheet section extending substantially parallel to the first sheet section, said second sheet section including oppositely facing edges, one of said oppositely facing edges being secure with an opposite outer edge of the first sheet section, and at least a surface of the first sheet section being provided with a coating for protecting the radiation- and light-sensitive surface of the image plate from damage;

(B) pushing the image plate into a gap between the first and second sheet sections in an inward direction extending parallel to the attached edges of said sheet sections and with the light-sensitive image plate surface being in contact with the first sheet section;

(C) placing the protective sheath and inserted image plate in an imaging cassette that is insertable in an imaging apparatus;

(D) inserting said imaging cassette into an imaging apparatus and exposing an image;

(E) removing the cassette from the imaging apparatus;

(F) opening the imaging cassette;

(G) transferring the image plate within the protective sheath to an image plate reader; and (H) pushing the image plate out of the gap between the first and the second sheet sections in an outward direction that is parallel to a length of the attached edges thereof and further to the reader.

43. The method of using a protective sheath for an image plate as set forth in claim 42 wherein at least one of steps (B), (C), (F), (G) and (H) is performed in a lighted space so that the operator is able to see the protective sheath while performing said at least one of the steps.

44. The method of using a protective sheath for an image plate as set forth in claim 42 wherein the step of pushing the image plate with a latent picture from out of the gap of the protective sheath and further to the reader is completely performed in a darkened space.

45. A method of using a protective sheath for an image plate to cover at least a radiation- and light-sensitive surface on an image plate and said protective sheath includes materials that are transmissive to radiation used in imaging but substantially non-transmissive to light for protecting a light-sensitive surface of the image plate at least from radiation that is capable of erasing latent image information from the image plate, as well as from radiation used for stimulating the image plate when reading the image information, said method including the steps of:

(A) providing a protective sheath comprising a continuous first sheet section having a size at least equal to that of the radiation- and light-sensitive surface of the image plate, at least one second sheet section extending substantially parallel to the first sheet section, said second sheet section including oppositely facing edges, one of said oppositely facing edges being secure with an opposite outer edge of the first sheet section, and at least a surface of the first sheet section being provided with a coating for protecting the radiation- and light-sensitive surface of the image plate from damage;

(B) pushing the image plate into a gap between the first and second sheet sections in an inward direction extending parallel to the attached edges of said sheet sections and with the light-sensitive image plate surface being in contact with the first sheet section;

(C) placing the protective sheath and the inserted image plate directly in an imaging apparatus, whereafter the exposure of an image can be performed;

(D) removing the image plate with its protective sheath from the imaging apparatus;

(E) transferring the image plate with its protective sheath to an image plate reader; and (F) pushing the image plate out of the gap between the first and the second sheet sections in an outward direction that is parallel to a length of the attached edges thereof and further to the reader.

46. The method of using a protective sheath for an image plate as set forth in claim 45 wherein at least one of steps (B), (E) and (F) is performed in a lighted space so that the operator is able to see the protective sheath during the procedure.

47. The method of using a protective sheath as set forth in claim 45 wherein the step of pushing the image plate out of the gap from between the first and second sheets and further to the reader is completely performed in a darkened space.

* * * * *